(12) United States Patent
Ogawa et al.

(10) Patent No.: US 7,169,481 B2
(45) Date of Patent: Jan. 30, 2007

(54) RADIATION IMAGE CONVERSION PANEL AND MANUFACTURING METHOD THEREFOR

(75) Inventors: Hiroshi Ogawa, Kaisei-machi (JP); Shinichiro Fukui, Kaisei-machi (JP); Yasuo Iwabuchi, Kaisei-machi (JP); Noriyuki Inoue, Kaisei-machi (JP); Shigeo Hirano, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 955 days.

(21) Appl. No.: 09/810,230

(22) Filed: Mar. 19, 2001

(65) Prior Publication Data

US 2002/0063224 A1    May 30, 2002

(30) Foreign Application Priority Data

Mar. 17, 2000    (JP)    ............... 2000-076773

(51) Int. Cl.
G01J 1/00    (2006.01)
B32B 9/00    (2006.01)

(52) U.S. Cl. ............... 428/690; 250/483.1; 250/484; 250/503.1; 252/301.4 H

(58) Field of Classification Search ............... 428/690, 428/917; 250/484, 483, 327, 483.1, 483.2, 250/484.4; 252/301.4 H
See application file for complete search history.

(56) References Cited

U.S. PATENT DOCUMENTS

| | | | | |
|---|---|---|---|---|
| 4,239,968 A | | 12/1980 | Kotera et al. ............ 250/327.1 |
| 4,604,525 A | * | 8/1986 | Kitada et al. ........... 250/363.01 |
| 4,728,583 A | * | 3/1988 | Yamazaki et al. ........... 428/690 |
| 4,963,751 A | * | 10/1990 | Kano et al. ............... 250/484.4 |
| 5,340,661 A | * | 8/1994 | Van Havenbergh et al. 428/690 |
| 5,466,541 A | * | 11/1995 | Van Havenbergh et al. 428/690 |
| 5,523,558 A | * | 6/1996 | Bringley et al. ......... 250/484.4 |
| 5,641,967 A | * | 6/1997 | Bringley et al. ......... 250/484.4 |
| 5,663,005 A | * | 9/1997 | Dooms et al. ............. 428/690 |
| 5,905,014 A | * | 5/1999 | Van de Bergh ............. 430/139 |
| 5,925,473 A | * | 7/1999 | Kuriyama et al. .......... 428/690 |
| 6,262,424 B1 | * | 7/2001 | Yanagita et al. ......... 250/483.1 |
| 6,344,657 B1 | * | 2/2002 | Matsumoto et al. ........ 250/588 |

FOREIGN PATENT DOCUMENTS

| | | |
|---|---|---|
| CA | 1 243 534 | 10/1988 |
| EP | 0234385 | * 9/1987 |
| JP | 55-12145 | 1/1980 |
| JP | 59-126299 | 7/1984 |
| JP | 59-126300 | 7/1984 |
| JP | 6-31908 | 4/1994 |

* cited by examiner

Primary Examiner—Rena Dye
Assistant Examiner—Camie S. Thompson
(74) Attorney, Agent, or Firm—Sughrue Mion, PLLC

(57) ABSTRACT

A radiation image conversion panel that has a phosphor layer. The phosphor layer contains a binding agent, a phosphor particle, and at least aryl carboxylic acid or alicyclic carboxylic acid, expressed by the following general Formula:

$$R-R^1-COOX, \text{ or}$$

$$R-COOX$$

in which R represents (1) an aryl group; (2) an aryl group, replaced with an alkyl group whose number of carbons is 1 to 5, a hydroxyl group, a carboxylic acid group, or a halogen group; (3) a hydroaryl group; or (4) a hydroaryl group (alicyclic group), replaced with an alkyl group whose number of carbons is 1 to 5, a hydroxyl group, or a halogen group; $R^1$ is a hydrocarbon radical whose number of carbons is 1 to 12; and X represents a hydrogen atom, alkaline metal, or $-N^+(R^2)_4$ (where $R^2$ represents an alkyl group whose number of carbons is 2 or less).

8 Claims, No Drawings

RADIATION IMAGE CONVERSION PANEL AND MANUFACTURING METHOD THEREFOR

BACKGROUND OF THE INVENTION

1. Field of the Invention

The present invention relates to a radiation image conversion panel that is employed in a radiation image converting method which takes advantage of phosphor, and a manufacturing method therefor.

2. Description of the Related Art

Radiography, which employs a combination of a silver halide photosensitive material (also referred to simply as a sensitive material) and a radiation intensifying screen, is known as a method of obtaining a radiation image for medical diagnosis and radiation images of various objects in a nondestructive manner. These images are employed for diagnosis, injury inspection, etc. This radiography is the process of forming a radiation image in the sensitive material, by irradiating radiation, transmitted through or emitted from a subject, to phosphor in the radiation intensifying screen to excite the phosphor and converting the radiation to near ultraviolet light or visible light. The formed radiation image is diagnosed and inspected. With one or both surfaces of the screen in intimate contact with the sensitive material that has one or two silver halide emulsifier layers at one or both surfaces of a support body, radiation is irradiated via a subject and an image is developed, whereby the radiation image is formed.

As a method that replaces this radiography, there is a radiation image converting method such as that described in Japanese Unexamined Patent Publication No. 55(1980)-12145. The method employs stimulatable phosphor, which absorbs radiation energy and, when excited with electromagnetic waves (such as visible light, infrared rays, etc.), emits the stored radiation energy in the form of fluorescence. This method utilizes a radiation image conversion panel (also called a storable phosphor sheet) containing stimulatable phosphor. Radiation, transmitted through or emitted from a subject, is irradiated to the stimulatable phosphor in this panel. When excited in a time series manner with electromagnetic waves (excitation light) such as visible light, infrared rays, etc., the stimulatable phosphor emits the stored radiation energy as fluorescence (photostimulated luminescent light). This fluorescence is read photoelectrically and converted into an electrical signal. Based on the electrical signal obtained, the radiation image of the subject is reproduced as a visible image.

The aforementioned radiation image converting method has the advantage that a radiation image with abundant information can be obtained with considerably less exposure, compared with the conventional radiography which employs a combination of radiography film and an intensifying screen. Therefore, this method has great utilization value in performing direct medical radiation photographing at the time of X-ray photographing for medical diagnosis.

The radiation image conversion panel that is employed in the radiation image converting method consists basically of a support body and stimulatable phosphor layer provided on one surface of the support body. Note that in the case where the phosphor layer is a self-supporting type, the support body is not always required. In addition, a transparent protection film is generally provided on a surface of the stimulatable phosphor layer remote from the support body (i.e., a surface on the side of the stimulatable phosphor layer not facing the support body). The protection film is used for protecting the phosphor layer from chemical degeneration and physical shock.

The stimulatable phosphor layer is composed generally of stimulatable phosphor particles and a binding agent for containing and supporting them in a dispersed state. The stimulatable phosphor particles have the property of absorbing radiation such as X-rays and, when irradiated with excitation light, exhibiting photostimulated luminescence. Therefore, the radiation transmitted through or emitted from a subject is absorbed in proportion to the amount of radiation in the stimulatable phosphor layer of the radiation image conversion panel, so that a radiation image for the subject is formed in the panel as a stored image of radiation energy. This stored image can be emitted as photostimulated luminescent light by irradiating the aforementioned excitation light. Therefore, it becomes possible to reproduce the stored image of radiation energy by photoelectrically reading the photostimulated luminescent light and converting it into an electrical signal.

While the radiation image converting method is a very advantageous image-forming method, as described above, the radiation image conversion panel employed in this method is also desired to be highly sensitive and to provide satisfactory picture quality (e.g., sharpness, graininess, etc.), as with the intensifying screen employed in the conventional radiography.

The sensitivity of the radiation image conversion panel is basically dependent on the total of photostimulated luminescence emitted by the stimulatable phosphor particles contained in the panel. The total of photostimulated luminescence varies not only with the luminescent brightness of the phosphor particles themselves but also with the phosphor content of the phosphor layer. Because a greater phosphor content means that absorption for radiation such as X-rays is also greater, even higher sensitivity is obtained and, at the same time, picture quality (particularly, graininess) enhances. In the case where the phosphor content of the phosphor layer is constant, the thickness of the phosphor layer can be made thinner as the phosphor layer is densely filled with phosphor particles. Consequently, the spread of excitation light by scattering can be reduced and high sharpness can be obtained accordingly.

As one of the radiation image conversion panels having a phosphor layer densely filled with phosphor particles, the present applicant has already filed a radiation image conversion panel and a manufacturing method therefor, in which a void ratio for a phosphor layer has been reduced by performing a compression process on the phosphor layer (see Japanese Unexamined Patent Publication Nos. 59(1984)-126299 and 59(1984)-126300).

The aforementioned radiation image conversion panel makes the density of the phosphor particles in the phosphor layer higher than that of the radiation image conversion panel theretofore made, by performing a compression process on the phosphor layer. Consequently, this radiation image conversion panel has excellent sharpness. However, it has the disadvantage that sensitivity reduction will occur, because some of the phosphor particles are destroyed by the compression process. For this reason, investigations have been made in order to improve the dispersibility of stimulatable phosphor particles so that before the compression process, the void ratio of the phosphor particles is made as low as possible.

To improve the dispersed state of the stimulatable phosphor particles, there is a method of performing dispersion for a long period of time when preparing stimulatable paint.

However, since great shearing force is exerted on the stimulatable phosphor particles when they are dispersed, there is a possibility that the characteristics of the stimulatable phosphor particles will be degraded. Furthermore, the method is undesirable for efficient operation, as it takes a long period of time to manufacture the radiation image conversion panel.

Hence, investigations have been made with respect to methods of effectively dispersing the aforementioned stimulatable phosphor particles without involving a great change to ordinary methods of manufacturing the radiation image conversion panel. As examples of these methods, there are a method of performing a surface process on stimulatable phosphor particles with a surface processing agent such as a silane coupling agent (see Japanese Patent Publication No. 6(1994)-31908) and a method of processing phosphor particles with a titanate coupling agent (see Japanese Patent Publication No. 8(1996)-540363). However, even these methods are insufficient as methods for obtaining a high-sensitive radiation image conversion panel by increasing the dispersibility and fill ratio of phosphor particles. This results from cases where the stability of the dispersion of the aforementioned stimulatable phosphor particles subjected to the surface process by use of the coupling agent is usually enhanced in the state of the coating solution, but compatibility for a resin component diminishes conversely, and is also because there are cases where the dispersed state of the final phosphor particles in the phosphor layer is not sufficiently improved.

SUMMARY OF THE INVENTION

The present invention has been made in view of the aforementioned problems found in the prior art. Accordingly, it is an important object of the present invention to provide a radiation image conversion panel with high sensitivity and less noise in which the dispersibility of phosphor particles has been improved.

Another important object of the invention is to provide a method of manufacturing a radiation image conversion panel, which is capable of enhancing a fill ratio for phosphor particles, while suppressing sensitivity reduction due to the process of compressing phosphor particles.

To achieve the aforementioned objects of the present invention and in accordance with an important aspect of the invention, there is provided a radiation image conversion panel comprising at least:

a support body; and a phosphor layer provided on the support body;

wherein the phosphor layer contains a binding agent, a phosphor, and at least aryl carboxylic acid or alicyclic carboxylic acid, expressed by the following general Formula:

$$R-R^1-COOX, \text{ or}$$

$$R-COOX$$

in which R represents (1) an aryl group; (2) an aryl group, replaced with an alkyl group whose number of carbons is 1 to 5, a hydroxyl group, a carboxylic acid group, or a halogen group; (3) a hydroaryl group; or (4) a hydroaryl group (alicyclic group), replaced with an alkyl group whose number of carbons is 1 to 5, a hydroxyl group, or a halogen group; $R^1$ is a hydrocarbon radical whose number of carbons is 1 to 12; and X represents a hydrogen atom, alkaline metal, or $-N^+(R^2)_4$ (where $R^2$ represents an alkyl group whose number of carbons is 2 or less).

The radiation image conversion panel of the present invention includes not only radiation image conversion panels, containing a stimulatable phosphor, which are employed in the radiation image converting method that employs a stimulatable phosphor, but also conventional radiation intensifying screens that are employed in radiography.

It is preferable that the aforementioned binding agent be thermoplastic elastomer with a softening temperature or melting point of 30 to 150° C. and particularly preferable that it be polyurethane resin.

In accordance with another important aspect of the invention, there is provided a method of manufacturing a radiation image conversion panel which comprises at least a support body and a phosphor layer, provided on the support body, which contains (1) a binding agent, (2) a phosphor, and (3) aryl carboxylic acid or alicyclic carboxylic acid, expressed by the following general Formula:

$$R-R^1-COOX, \text{ or}$$

$$R-COOX$$

in which R represents (1) an aryl group; (2) an aryl group, replaced with an alkyl group whose number of carbons is 1 to 5, a hydroxyl group, a carboxylic acid group, or a halogen group; (3) a hydroaryl group; or (4) a hydroaryl group (alicyclic group), replaced with an alkyl group whose number of carbons is 1 to 5, a hydroxyl group, or a halogen group; $R^1$ is a hydrocarbon radical whose number of carbons is 1 to 12; and X represents a hydrogen atom, alkaline metal, or $-N^+(R^2)_4$ (where $R^2$ represents an alkyl group whose number of carbons is 2 or less);

the method comprising the step of forming the phosphor layer by dispersing and coating the phosphor, the aryl carboxylic acid or alicyclic carboxylic acid, and the binding agent.

It is preferable that the phosphor layer be formed by performing a surface process on particles of the phosphor with the aryl carboxylic acid or alicyclic carboxylic acid, and dispersing and coating the surface-processed phosphor particles on the binding agent.

It is also preferable to bond the phosphor layer, formed by dispersing and coating the surface-processed phosphor particles, and the support body together, by placing the phosphor layer on the support body and compressing the phosphor layer at a temperature higher than the softening temperature or melting point of the binding agent. (Note that there are cases where the phosphor layer in the present invention is also referred to as a phosphor sheet, because the phosphor layer in the form of a sheet is placed and bonded on the support body when forming the phosphor layer.)

As described above, the phosphor layer of the radiation image conversion panel of the prevent invention contains at least aryl carboxylic acid or alicyclic carboxylic acid, expressed by the following general Formula:

$$R-R^1-COOX, \text{ or}$$

$$R-COOX$$

in which R represents (1) an aryl group; (2) an aryl group, replaced with an alkyl group whose number of carbons is 1 to 5, a hydroxyl group, a carboxylic acid group, or a halogen group; (3) a hydroaryl group; or (4) a hydroaryl group (alicyclic group), replaced with an alkyl group whose number of carbons is 1 to 5, a hydroxyl group, or a halogen group; $R^1$ is a hydrocarbon radical whose number of carbons is 1 to 12; and X represents a hydrogen atom, alkaline metal, or —$N^+$ ($R^2$)$_4$ (where $R^2$ represents an alkyl group whose number of carbons is 2 or less). For this reason, phosphor particles strongly adsorb the aforementioned aryl carboxylic acid or alicyclic carboxylic acid, unlike the case of employing a coupling agent as a surface processing agent for phosphor particles. As a result, a monomolecular film of organic substance can be formed. Therefore, aggregation of the phosphor particles can be prevented and the phosphor particles can be uniformly dispersed. Furthermore, the bond between the inorganic phosphor particles and the organic binding agent can be made satisfactory.

In addition, the phosphor particle surfaces in the radiation image conversion panel of the present invention have been processed by aryl carboxylic acid or alicyclic carboxylic acid. Therefore, the phosphor particles disperse into the phosphor layer uniformly, the affinity between the phosphor particle surface and the binding agent resin is enhanced, and a fill ratio for the phosphor particles can be increased. As a result, the phosphor particles can be prevented from being destroyed by the step of compressing the particles.

Besides, the aryl carboxylic acid or alicyclic carboxylic acid employed in the phosphor layer has strong interaction. Therefore, even after formation of the phosphor layer, the separation of phosphor particles from the surface is prevented. This can appreciably enhance durability. Moreover, a radiation image conversion panel with satisfactory waterproofing and durability is obtainable, because aryl carboxylic acid or alicyclic carboxylic acid is low in water absorption degree, compared with other organic acid compounds such as sulfonic acid, etc.

As described previously, the conversion panel manufacturing method of the present invention forms the phosphor layer by dispersing and coating phosphor particles, aryl carboxylic acid (or alicyclic carboxylic acid), and a binding agent, or by performing a surface process on phosphor particles with aryl carboxylic acid or alicyclic carboxylic acid and dispersing and coating the surface-processed phosphor particles on the binding agent. Therefore, aggregation of the phosphor particles is prevented and the phosphor particles strongly adsorb aryl carboxylic acid or alicyclic carboxylic acid. This makes uniform dispersion of the phosphor particles possible.

In the case where, in the conversion panel manufacturing method of the present invention, the phosphor layer, formed by dispersing and coating the surface-processed phosphor particles, and the support body are bonded together by placing the phosphor layer on the support body and compressing the phosphor layer at a temperature higher than the softening temperature or melting point of the binding agent, damage to the phosphor particles can be more readily prevented.

More specifically, the phosphor particles, dispersed in the binding agent heated to a temperature higher than the softening temperature or melting point of the binding agent, have a certain degree of freedom when compressed, so that they can be oriented without difficulty by the pressure exerted on them. Moreover, the phosphor sheet is placed on the support body without being fixed to the support body, and is bonded to the support body while being compressed. Therefore, even if the phosphor sheet is compressed with the force that would destroy the phosphor particles if they were fixed to the support body, the phosphor particles can be moved to be oriented and therefore the phosphor sheet can be extended and spread thinly.

DESCRIPTION OF THE PREFERRED EMBODIMENTS

The radiation image conversion panel of the present invention will hereinafter be described in detail. Initially, a description will be given of phosphors that can be used in the radiation image conversion panel.

In the case of employing a stimulatable phosphor, it is a phosphor that exhibits photostimulated luminescence when irradiated with excitation light after being irradiated with radiation, as described previously. However, it is desirable from the viewpoint of practical use that it be a phosphor which exhibits photostimulated luminescence of wavelength 300 to 500 nm when irradiated with excitation light of wavelength 400 to 900 nm. Examples of the stimulatable phosphor that can be employed in the radiation image conversion panel of the present invention are:

(1) A phosphor expressed with $BaSO_4$:AX described in Japanese Unexamined Patent Publication No. 48(1973)-80487, and a phosphor expressed with $SrSO_4$:AX described in Japanese Unexamined Patent Publication No. 48(1973)-80489;

(2) $Li_2B_4O_7$:(Cu, Ag) described in Japanese Unexamined Patent Publication No. 53(1978)-39277;

(3) $Li_2O.(B_2O_2)_x$:Cu and $Li_2O.(B_2O_2)_x$:(Cu, Ag) described in Japanese Unexamined Patent Publication No. 54(1979)-47883;

(4) SrS: (Ce, Sm), SrS: (Eu, Sm), $ThO_2$:Er, and $LaB_2O_2S$: (Eu, Sm), described in U.S. Pat. No. 3,859,527;

(5) ZnS:(Cu, Pb) and $BaO.xAl_2O_3$:Eu (where $0.8 \leq x \leq 10$), and $M^{II}O.xSiO_2$:A (where $M^{II}$ is Mg, Ca, Sr, Zn, Cd, or Ba; A is Ce, Tb, Eu, Tm, Pb, Tl, Bi, or Mn; and x is $0.5 \leq x \leq 2.5$), described in Japanese Unexamined Patent Publication No. 55(1980)-12142;

(6) $(Ba_{1-x-y}, Mg_x, Ca_y)FX:aEu^{2+}$ (where X is at least Cl or Br; x and y are $x+y \leq 0.6$ and $xy \neq 0$; and a is $10^{-6} \leq a \leq 10^{-2}$), described in Japanese Unexamined Patent Publication No. 55(1980)-12143;

(7) $LnO_x$:xA (where X is at least one of La, Y, Gd, or LU; X is at least Cl or Br; A is at least Ce or Tb; and x is $0<x<0.1$), described in Japanese Unexamined Patent Publication No. 55(1980)-12144;

(8) $(Ba_{1-x}, M^{2+}_x)FX$:yA (where $M^{2+}$ is at least one of Mg, Ca, Sr, Zn, or Cd; X is at least one of Cl, Br, or I; A is at least one of Eu, Tb, Ce, Tm, Dy, Pr, Ho, Nd, Yb, or Er; x is $0 \leq x \leq 0.6$; and y is $0 \leq y > 0.2$), described in Japanese Unexamined Patent Publication No. 55(1980)-12145;

(9) A phosphor expressed with BaFX:xCe.yA described in Japanese Unexamined Patent Publication No. 55(1980)-843897;

(10) A phosphor expressed with a composition formula of $M^{II}FX.xA$:yLn (where $M^{II}$ is at least one of Ba, Ca, Sr, Mg, Zn, or Cd; A is at least one of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$, or $ThO_2$; Ln is at least one of Eu, Tb, Ce, Tm, Dy, Pr, Ho, Nd, Yb, Er, Sm, or Gb; X is at least one of Cl, Br, or I; x is $5 \times 10^{-5} \leq x \leq 0.5$; and y is $0 < y \leq 0.2$), described in Japanese Unexamined Patent Publication No. 55(1980)-160078;

(11) A phosphor expressed with a composition formula of $(Ba_{1-x}, M^{II}_x)F_2.aBaX_2$:(yEu, zA) (where $M^{II}$ is at least one of beryllium, magnesium, calcium, strontium, zinc, or cadmium; X is at least one of chlorine, bromine, or iodine; A is at least one of zirconium or scandium; a is $0.5 \leq a \leq 1.25$; x is $0 \leq x \leq 1$; y is $10^{-6} \leq y \leq 2 \times 10^{-1}$; and z is $0 < z \leq 10^{-2}$), described in Japanese Unexamined Patent Publication No. 56(1981)-116777;

(12) A phosphor expressed with a composition formula of $(Ba_{1-x}, M^{II}_x)F_2 \cdot aBaX_2:(yEu, zB)$ (where $M^{II}$ is at least one of beryllium, magnesium, calcium, strontium, zinc, or cadmium; X is at least one of chlorine, bromine, or iodine; a is $0.5 \leq a \leq 1.25$; x is $0 \leq x \leq 1$; y is $10^{-6} \leq y \leq 2 \times 10^{-1}$; and z is $0 < z \leq 10^{-2}$), described in Japanese Unexamined Patent Publication No. 57(1982)-23673;

(13) A phosphor expressed with a composition formula of $(Ba_{1-x}, M^{II}_x)F_2 \cdot aBaX_2:(yEu, zA)$ (where $M^{II}$ is at least one of beryllium, magnesium, calcium, strontium, zinc, or cadmium; X is at least one of chlorine, bromine, or iodine; A is at least arsenic or silicon; a is $0.5 \leq a \leq 1.25$; x is $0 \leq x \leq 1$; y is $10^{-6} \leq y \leq 2 \times 10^{-1}$; and z is $0 \leq z \leq 5 \times 10^{-1}$), described in Japanese Unexamined Patent Publication No. 57(1982)-23675;

(14) A phosphor expressed with a composition formula of $M^{III}OX:xCe$ (where $M^{III}$ is at least one kind of trivalent metal selected from a group of Pr, Nd, Pm, Sm, Eu, Tb, Dy, Ho, Er, Tm, Yb, and Bi; X is either Cl or Br, or both; and x is $0 < x \leq 0.1$), described in Japanese Unexamined Patent Publication No. 58(1983)-69281;

(15) A phosphor expressed with a composition formula of $Ba_{1-x}, M_{x/2}L_{x/2}FX:yEu^{2+}$ (where M is at least one kind of alkali metal selected from a group of Li, Na, K, Rb, and Cs; L is at least one kind of trivalent metal selected from a group of Sc, Y, La, Ce, Pr, Nd, Pm, Sm, Gd, Tb, Dy, Ho, Er, Tm, Yb, Lu, Al, Ga, In, and Tl; X is at least one kind of halogen selected from a group of Cl, Br, and I; x is $10^{-2} \leq x \leq 0.5$; and y is $0 < y \leq 0.1$), described in Japanese Unexamined Patent Publication No. 58(1983)-206678;

(16) A phosphor expressed with a composition formula of $BaFX \cdot xA:yEu^{2+}$ (where X is at least one kind of halogen selected from a group of Cl, Br, and I; A is the burned product of a tetrafluoroborate; x is $10^{-6} \leq x \leq 0.1$; and y is $0 < y \leq 0.1$), described in Japanese Unexamined Patent Publication No. 59 (1984)-27980;

(17) Phosphors expressed with $xM_3(PO_4)_2 \cdot NX_2:yA$, and $M_3(PO_4)_2:yA$, and with $nReX_3 \cdot mAX'_2:xEu$, $nReX_3 \cdot mAX'_2:(xEu, ySm)$, and $M^IX \cdot aM^{II}X'_2 \cdot bM^{III}X''_3:cA$, described in Japanese Unexamined Patent Publication No. 59(1984)-38278;

(18) A phosphor expressed with a composition formula of $BaFX \cdot xA:yEu^{2+}$ (where X is at least one kind of halogen selected from a group of Cl, Br, and I; A is the burned product of at least one kind of compound selected from a hexafluoric compound group consisting of monovalent or bivalent metallic salts of hexafluorosilicic acid, hexafluororotitanic acid, and hexafluorozirconic acid; x is $10^{-6} \leq x \leq 0.1$; and y is $0 < y \leq 0.1$), described in Japanese Unexamined Patent Publication No. 59(1984)-47289;

(19) A phosphor expressed with a composition formula of $BaFX \cdot xNaX':aEu^{2+}$ (where X and X' are both at least one of Cl, Br, or I; x is $10^{-6} \leq x \leq 2$; and a is $0 < a \leq 0.2$), described in Japanese Unexamined Patent Publication No. 59(1984)-56479;

(20) A phosphor expressed with a composition formula of $M^{II}FX \cdot xNaX':yEu^{2+}:zA$ (where $M^{II}$ is at least one kind of alkaline-earth metal selected from a group of Ba, Sr, and Ca; X and X' are both at least one kind of halogen selected from a group of Cl, Br, and I; A is at least one kind of transition metal selected from V, Cr, Mn, Fe, Co, and Ni; x is $0 < x \leq 2$, y is $0 < y \leq 0.2$; and z is $0 < z \leq 10^{-2}$) described in Japanese Unexamined Patent Publication No. 59(1984)-56480;

(21) A phosphor expressed with a composition formula of $M^{II}FX \cdot aM^IX' \cdot bM^{II}X''_2 \cdot cM^{III}X_3 \cdot xA:yEu^{2+}$ (where $M^{II}$ is at least one kind of alkaline-earth metal selected from a group of Ba, Sr, and Ca; $M^I$ is at least one kind of alkaline metal selected from a group of Li, Na, K, Pb, and Cs; $M^{III}$ is at least one kind of bivalent metal selected from a group of Be and Mg; $M^{III}$ is at least one kind of trivalent metal selected from a group of Al, Ga, In, and Tl; A is a metallic oxide; X', X", and X are at least one kind of halogen selected from a group of F, Cl, Br, and I; a is $0 \leq a \leq 2$; b is $0 \leq b \leq 10$; C is $0 \leq c \leq 10^{-2}$ and $a+b+c \geq 10^{-6}$; x is $0 < x \leq 0.5$; and y is $0 < y \leq 0.2$), described in Japanese Unexamined Patent Publication No. 59(1984)-75200;

(22) A stimulatable phosphor expressed with a composition formula of $M^{II}X_2 \cdot aM^{II}X'_2:xEu^{2+}$ (where $M^{II}$ is at least one kind of alkaline-earth metal selected from a group of Ba, Sr, and Ca; X and X' are at least one kind of halogen selected from a group of Cl, Br, and I, and are X≈X'; a is $0.1 \leq a \leq 10.0$; and x is $0 < x \leq 0.2$), described in Japanese Unexamined Patent Publication No. 60(1985)-84381;

(23) A stimulatable phosphor expressed with a composition formula of $M^{II}FX \cdot aM^IX':xEu^{2+}$ (where $M^{II}$ is at least one kind of alkaline-earth metal selected from a group of Ba, Sr, and Ca; $M^I$ is at least one kind of alkaline-earth metal selected from a group of Rb and Cs; X is at least one kind of halogen selected from a group of Cl, Br, and I; X' is at least one kind of halogen selected from a group of F, Cl, Br, and I; a is $0 \leq a \leq 4.0$; and x is $0 < x \leq 0.2$), described in Japanese Unexamined Patent Publication No. 60(1985)-101173; and

(24) A stimulatable phosphor expressed with a composition formula of $M^IX:xBi$ (where $M^I$ is at least one kind of alkaline metal selected from a group of Rb and Cs; X is at least one kind of halogen selected from a group of Cl, Br, and I; x is a numerical value in a range of $0 < x \leq 0.2$), described in Japanese Unexamined Patent Publication No. 62(1987)-25189.

The stimulatable phosphor $M^{II}X_2 \cdot aM^{II}X'_2:xEu^{2+}$, described in the aforementioned Japanese Unexamined Patent Publication No. 60(1985)-84381, may contain the following additives at the following rates per 1 mole of $M^{II}X_2 \cdot aM^{II}X'_2$:

(1) $bM^IX''$ (where $M^I$ is at least one kind of alkaline metal selected from a group of Rb and Cs; " is at least one kind of halogen selected from a group of F, Cl, Br, and I; and b is $0 < b \leq 10.0$), described in Japanese Unexamined Patent Publication No. 60(1985)-166379;

(2) $bK'' \cdot cMgX_2 \cdot dM^{III}X'_3$ (where $M^{III}$ is at least one kind of trivalent metal selected from a group of Sc, Y, La, Gd, and Lu; X", X, and X' are at least one kind of halogen selected from a group of F, Cl, Br, and I; and b, c, and d are $0 \leq b \leq 2.0$, $0 \leq c \leq 2.0$, $0 \leq d \leq 2.0$, and $2 \times 10^{-5} \leq b+c+d$), described in Japanese Unexamined Patent Publication No. 60(1985)-221483;

(3) yB (where y is $2 \times 10^{-4} \leq y \leq 2 \times 10^{-1}$), described in Japanese Unexamined Patent Publication No. 60(1985)-228592;

(4) bA (where A is at least one kind of oxide selected from a group of $SiO_2$ and $P_2O_5$, and b is $10^{-4} \leq b \leq 2 \times 10^{-1}$), described in Japanese Unexamined Patent Publication No. 60(1985)-228593;

(5) bSiO (where b is $0 < b \leq 3 \times 10^{-2}$), described in Japanese Unexamined Patent Publication No. 61(1986)-120883;

(6) $bSnX''_2$ (where X" is at least one kind of halogen selected from a group of F, Cl, Br, and I, and b is $0 < b \leq 10^{-3}$ described in Japanese Unexamined Patent Publication No. 61(1986)-120885;

(7) $bCs'' \cdot cSnX_2$ (where " and X are at least one kind of halogen selected from a group of F, Cl, Br, and I, and b and c are $0<b\leq10.0$ and $10^{-6}\leq c\leq 2\times10^{-2}$), described in Japanese Unexamined Patent Publication No. 61(1986)-235486; or (8) bCs".yLn$^{3+}$ (where" is at least one kind of halogen selected from a group of F, Cl, Br, and I; Ln is at least one kind of rare-earth element selected from a group of Sc, Y, Ce, Pr, Nd, Sm, Gd, Tb, Dy, Ho, Er, Tm, Yb, and Lu, and b and y are $0<b\leq10.0$ and $10^{-6}\leq y\leq1.8\times10^{-1}$), described in Japanese Unexamined Patent Publication No. 61(1986)-235487.

In addition, a rare-earth activator alkaline-earth-metal fluorohalide stimulatable phosphor, expressed by the following basic composition formula, may be employed.

$$(Ba_{1-a}, M^{II}_a)FX:zLn \quad (I)$$

in which $M^{II}$ represents at least one kind of alkaline-earth metal selected from a group of Sr and Ca, Ln represents at least one kind of rare-earth element selected from a group of Ce, Pr, Sm, Eu, Tb, Dy, Ho, Nd, Er, Tm, and Yb, X represents at least one kind of halogen selected from a group of Cl, Br, and I, and a represents a numerical value in a range of $0\leq a<1$, and z represents a numerical value in a range of $0<z\leq0.2$. It is preferable that the letter "a" in the above-mentioned basic composition formula (I) be a numerical value less than or equal to 0.5.

It is particularly preferable that Ln be Eu or Ce. The composition formula (I) does not indicate that the composition is F:X=1:1 stoichiometrically, but indicates it is a compound with a PbFCl type crystal structure, expressed by $(Ba_{1-a}, M^{II}_a)FX$. In general, it is preferable that many F$^+$ (X$^-$) centers, which are unoccupied lattice points for X-ions, be generated in the BaFX crystal, because a photostimulated-luminescence efficiency for light of wavelength 600 to 700 nm is enhanced. In such a case, the quantity of F is often slightly greater than that of X.

Note that although omitted in the basic composition formula (I), the following additives maybe added to (I) as occasion demands.

$$bA, wN^I, xN^{II}, or yN^{III}$$

in which $N^I$ represents at least one kind of alkaline metal compound selected from a group of Li, Na, K, Rb, and Cs, $N^{II}$, represents at least one kind of alkaline-earth metal compound selected from a group of Mg and Be, and $N^{III}$ represents at least one kind of trivalent metal compound selected from a group of Al, Ga, In, Tl, Sc, Y, La, Gd, and Lu. It is preferable that these metal compounds employ halides such as those described in the aforementioned Japanese Unexamined Patent Publication No. 59(1984)-75200. However, the present invention is not limited to these halides. The letter A in "bA" represents a metal oxide such as $Al_2O_3$, $SiO_2$, $ZrO_2$, etc. It is preferable that the metal oxide be ultrafine particles whose size of the primary particles is 0.1 μm or less and have low reactivity with $(Ba_{1-a}, M^{II}_a)FX$, in order to prevent sintering of BaFX particles. Particularly, $Al_2O_3$ is preferred. The letters b, w, x, and y in "bA, wN$^I$, xN$^{II}$, and yN$^{III}$" refer to charges of addition when the molar quantity of $(Ba_{1-a}, M^{II}_a)FX$ is taken to be 1, and represent numerical values in ranges of $0\leq b\leq0.5$, $0\leq w\leq2$, $0\leq x\leq0.3$, and $0\leq y\leq0.3$, respectively. For additives that are reduced in quantity by baking and subsequent processes, these numerical values do not represent a ratio of elements contained in the final composition. In the final composition, some elements, as they are, remain as compounds, and others react with BaFX or are taken in.

In addition, (1) Zn and Cd compounds as described in the aforementioned Japanese Unexamined Patent Publication No. 55(1980)-12145, (2) $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$, and $ThO_2$ which are metal oxides as described the aforementioned Japanese Unexamined Patent Publication No. 55(1980)-160078, (3) Zr and Sc compounds as described in the aforementioned Japanese Unexamined Patent Publication No. 56(1981)-116777, (4) a compound of Bas described in the aforementioned Japanese Unexamined Patent Publication No. 57(1982)-23673, (5) As and Si compounds as described in the aforementioned Japanese Unexamined Patent Publication No. 57(1982)-23675, (6) tetrafluoroborate as described in the aforementioned Japanese Unexamined Patent Publication No. 59(1984)-27980 (7) a hexafluoric compound consisting of monovalent or bivalent metallic salts of hexafluorosilicic acid, hexafluorotitanic acid, and hexafluorozirconic acid, described in the aforementioned Japanese Unexamined Patent Publication No. 59(1984)-47289, or (8) a compound of transition metal such as V, Cr, Mn, Fe, Co, and Ni, described in the aforementioned Japanese Unexamined Patent Publication No. 59(1984)-56480, may further be added as occasion demands. However, the present invention is not limited to phosphors containing the above-mentioned additives, but is also applicable to any substance that basically contains a composition which is considered as a rare-earth activator alkaline-earth-metal fluorohalide stimulatable phosphor.

The rare-earth activator alkaline-earth-metal fluorohalide stimulatable phosphor, expressed with the above-mentioned basic composition formula (I), normally has an aspect ratio of 1.0 to 5.0. The rare-earth activator alkaline-earth-metal fluorohalide stimulatable phosphor in the present invention has a particle aspect ratio of 1.0 to 2.0 (preferably 1.0 to 1.5), a median particle diameter (Dm) of 1 to 10 μm (preferably, 2 to 7 μm), and a particle size distribution ratio σ/Dm (where a is a standard deviation in a particle size distribution) of 50% or less (preferably, 40% or less). The particle configuration maybe in the form of a rectangular solid, a regular hexahedron, a regular octahedron, an intermediate polyhedron of those polyhedrons, a 14-hedron, etc., and the 14-hedron is preferred. However, a stimulatable phosphor to be employed in the present invention is not always limited to the 14-hedron type, if it meets the aforementioned particle aspect ratio, particle size, and particle size distribution ratio.

Of the aforementioned stimulatable phosphors, the bivalent-europium activator alkaline-earth-metal halide phosphor and the cerium activator rare-earth oxyhalide phosphor are particularly preferred because they exhibit photostimulated luminescence with high brightness. However, the stimulatable phosphors that are employed in the present invention are not limited to the aforementioned phosphors. Any form of phosphor will be satisfactory if it exhibits photostimulated luminescence when irradiated with excitation light after being irradiated with radiation.

Among the aforementioned stimulatable phosphors, the phosphor, which has its particle surfaces partially oxidized by performing baking or cooling under a weak oxidation atmosphere in the course of or at the end of a baking process, is particularly preferred because its erase characteristic is good.

The preferred examples of a phosphor, which is used in employing the radiation image conversion panel of the present invention as a radiation intensifying screen, are: tungstate phosphors ($CaWO_4$, $MgWO_4$, $CaWO_4$:Pb, etc.), terbium activator rare-earth oxysulfide phosphors ($Y_2O_2S$:Tb, $Gd_2O_2S$: Tb, $La_2O_2S$:Tb, $(Y, Gd)_2O_2S$:Tb, $(Y, Gd)_2O_2S$:

(Tb, Tm), etc.), terbium activator rare-earth phosphate phosphors (YPO$_4$:Tb, GdPO$_4$:Tb, LaPO$_4$:Tb, etc.), terbium activator rare-earth oxyhalide phosphors (LaOBr:Tb, LaOBr: (Tb, Tm), LaOCl:Tb, LaOCl:(Tb, Tm), GdOBr:Tb, GdOCl: Tb, etc.), thulium activator rare-earth oxyhalide phosphors (LaOBr:Tm, LaOCl:Tm, etc.), barium sulfate phosphors (BaSO$_4$:Pb, BaSO$_4$:Eu$^{2+}$, (Ba, Sr)SO$_4$:Eu$^{2+}$, etc.), bivalent-europium activator alkaline-earth-metal phosphate phosphors (Ba$_3$(PO$_4$)$_2$:Eu$^{2+}$, etc.), bivalent-europium activator alkaline-earth-metal fluorohalide phosphors (BaFCl:Eu$^{2+}$, BaFBr:Eu$^{2+}$, BaFCl: (Eu$^{2+}$, Tb), BaFBr: (Eu$^2$, Tb), BaF$_2$ BaCl$_2$ KCl:Eu$^{2+}$, (Ba.Mg)F$_2$.BaCl$_2$.KCl:Eu$^{2+}$, etc.), iodide-phosphors (CsI:Na, CsI:Tl, NaI, KI:Tl, etc.), sulfate phosphors (ZnS:Ag, (Zn, Cd)S:Ag, (Zn, Cd)S:Cu, (Zn, Cd)S: (Cu, Al), etc.), phosphoric acid hafnium phosphors (HfP$_2$O$_7$: Cu, etc.), and tantalate phosphors (YTaO$_4$, YTaO$_4$:Tm, YTaO$_4$:Nb, (Y, Sr)TaO$_4$:Nb, LuTaO$_4$, LuTaO$_4$:Nb, (Lu, Sr)TaO$_{4-X}$:Nb, GdTaO$_4$:Tm, Gd$_2$O$_3$.Ta$_2$O$_5$.B$_2$O$_3$:Tb, etc.). However, the present invention is not limited to these phosphors, but is capable of using other phosphors if they emit visible light or near-violet light when irradiated with radiation.

The radiation image conversion panel of the present invention is characterized in that its phosphor layer contains the aforementioned stimulatable phosphor (or a phosphor), a binding agent, and at least aryl carboxylic acid or alicyclic carboxylic acid, expressed by the following general Formula:

R—R$^1$—COOX (1), or

R—COOX (2)

in which R represents (1) an aryl group; (2) an aryl group, replaced with an alkyl group whose number of carbons is 1 to 5, a hydroxyl group, a carboxylic acid group, or a halogen group; (3) a hydroaryl group; or (4) a hydroaryl group (alicyclic group), replaced with an alkyl group whose number of carbons is 1 to 5, a hydroxyl group, or a halogen group; R$^1$ is a hydrocarbon radical whose number of carbons is 1 to 12; and X represents a hydrogen atom, alkaline metal, or-N$^+$ (R$^2$) 4 (whereR$^2$ represents an alkyl group whose number of carbons is 2 or less).

Particularly, it is preferable that the letter R in the aforementioned general Formula (1) or (2) be an aryl group or an aryl group replaced with a hydroxyl group, methyl, or ethyl.

The preferred examples of Rare a methyl group, an ethyl group, a propyl group, a butyl group, an isopropyl group, a diphenylmethyl group, and an aryl group replaceable with methyl or ethyl (e.g., a phenyl group, a naphthyl group, an antolyl group, a diphenyl group, a p-ethylphenyl group, a tolyl group, a xylyl group, etc.). Note that the aforementioned aryl may be hydrogenated into an alicyclic group or contain a ring other than a benzen ring such as indene or tetralin.

The following compounds can be listed as the aryl carboxylic acid or alicyclic carboxylic acid expressed by the aforementioned general Formula (1) or (2).

(1) Benzoic acid

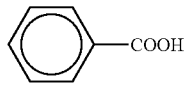

-continued (2) Hydrocinnmic acid

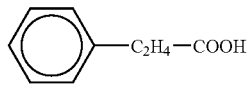

(3) Phthalic acid

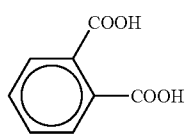

(4) Salts of the above-mentioned acids (5) Salicylic acid

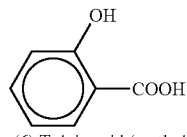

(6) Toluic acid (methylbenzoic acid)

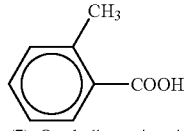

(7) O-ethylbenzoic acid

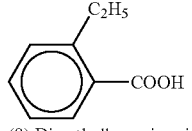

(8) Dimethylbenzoic acid

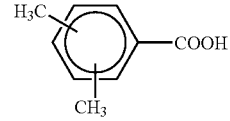

(9) Trimethylbenzoic acid

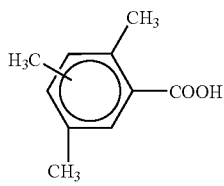

(10) Cyclohexylcarboxylic acid

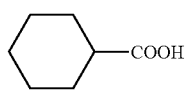

(11) Salt of the above-mentioned carboxylic acid

Of the above-mentioned carboxylic acid compounds, the aryl carboxylic acid with an aryl group is desirable and the aryl carboxylic acid with a phenyl group is more desirable.

It is preferable that the color of the aryl carboxylic acid or alicyclic carboxylic acid be colorless to light yellow, because there is no possibility that it will have an adverse effect on excitation light or luminescent light.

The aryl carboxylic acid or alicyclic carboxylic acid has the property of being adsorbed or bonded on to a metal surface by the aforementioned polar groups. Therefore, it is considered that in the phosphor layer of the present invention, the aryl carboxylic acid or alicyclic carboxylic acid has similarly been adsorbed or bonded mainly on to the phosphor particle surfaces by the aforementioned polar groups. The adsorption of the aryl carboxylic acid or alicyclic carboxylic acid onto metal surfaces is so strong that it is difficult to separate it from the metal surfaces, compared with other organic acid compounds such as carboxylic acid, sulfonic acid, etc. Therefore, the aryl carboxylic acid or alicyclic carboxylic acid has been strongly adsorbed on to the surfaces of the phosphor particles of the present invention, and the surfaces have been covered with an aromatic ring, etc. Consequently, it is considered that the affinity of the phosphor particles with respect to resin components is enhanced and the dispersion stability of the phosphor particles is improved.

In addition, the phosphor particles and the binding agent will have strong interaction by the aforementioned adsorbing action of the aryl carboxylic acid or alicyclic carboxylic acid. Therefore, it is considered that even if the phosphor layer is formed, the separation of the phosphor particles from the surface will not take place and running durability will be enhanced appreciably. Furthermore, the aryl carboxylic acid or alicyclic carboxylic acid that is employed in the present invention is satisfactory in water proofing and durability because it is low in water absorbability, compared with other organic compounds such as sulfonic acid, etc.

It is preferable that the content of the aforementioned aryl carboxylic acid or alicyclic carboxylic acid in the phosphor layer of the radiation image conversion panel of the present invention be within a range of 0.001 to 5 parts by weight per 100 parts by weight of phosphor particles. Particularly, if the content is set within a range of 0.005 to 2 parts by weight, a gloss for the phosphor layer surface will be enhanced and the dispersed state of the phosphor particles can thus be made better. Furthermore, the light emitting characteristic is considerably improved by setting the content within a range of 0.01 to 1 weight part. In the case where the content is less than 0.001 weight part, there are cases where the effect of the combination will not develop effectively. Even if, on the other hand, the content is increased to more than 5 parts by weight, the dispersed state of the phosphor particles will not be enhanced any further.

The radiation image conversion panel of the present invention can be manufactured, for example, by the following method. While a description will be given of a method for manufacturing the radiation image conversion panel that contains a stimulatable phosphor, a radiation intensifying screen to be employed in radiography can be likewise manufactured by a known method.

The panel manufacturing method of the present invention can be performed by the step of forming a phosphor sheet by dispersing and coating phosphor particles along with the aryl carboxylic acid or alicyclic carboxylic acid of the present invention, a binding agent, etc., and the step of placing the phosphor sheet on a support body, and bonding the phosphor sheet to the support body while compressing the sheet at a temperature higher than the softening temperature or melting point of the binding agent. The panel manufacturing method of the present invention can also be performed by the step of performing a surface process on phosphor particles with the aryl carboxylic acid or alicyclic carboxylic acid, the step of forming a phosphor sheet by dispersing and coating the surface-processed phosphor particles and a binding agent, and the step of placing the phosphor sheet on a support body, and bonding the phosphor sheet to the support body while compressing the sheet at a temperature higher than the softening temperature or melting point of the binding agent.

A method for enhancing the dispersibility of phosphor particles by containing aryl carboxylic acid or alicyclic carboxylic acid can be performed by dissolving or dispersing the aryl carboxylic acid or alicyclic carboxylic acid into an organic solvent having a low melting point, putting the phosphor particles into this solution and mixing them, then removing the organic solvent and preparing surface-processed phosphor particles, forming the surface-processed phosphor particles into a phosphor layer, and manufacturing a radiation image conversion panel from the phosphor layer. The method can also be performed by mixing and dispersing aryl carboxylic acid or alicyclic carboxylic acid, preferably aryl carboxylic acid or alicyclic carboxylic acid dissolved or dispersed in some of a solvent for phosphor paint preparation, when preparing phosphor paint.

The preferred example of the binding agent that is employed in the present invention is thermoplastic resin that has elasticity at normal temperature and, when heated, will have fluidity. The preferred examples of the thermoplastic resin are polyurethane, polystyrene elastomer, polyolefin copolymer, polyester, polyamide, polybutadiene, ethylene vinyl acetate, vinyl chloride copolymer, natural rubber, fluororubber, polyisoprene, chlorinated polyethylene, butadiene copolymer, silicon rubber, etc.

Of the aforementioned thermoplastic resins, elastomer is particularly preferred. Elastomer with a softening temperature or melting point of 30 to 300° C. is commonly used. However, it is more desirable to employ elastomer having a softening temperature or melting point of 30 to 150° C. Particularly, it is desirable that it be polyurethane resin and more desirable that it be polyurethane resin containing a functional group, such as a sulfonic acid group, a carboxylic acid group, a phosphoric acid group, etc.

The aforementioned binding agent is mixed sufficiently with phosphor particles and a solvent to prepare a coating solution in which the phosphor particles have been dispersed uniformly in the binding agent solution.

The preferred examples of the solvent are: lower alcohol such as methanol, ethanol, n-propanol, n-butanol, etc.; chlorine-atom containing hydrocarbon such as methylene chloride, ethylene chloride, etc.; ketone such as acetone, methyl ethyl ketone, methyl isobutyl ketone, etc.; ester of lower fatty acid and lower alcohol, such as methyl acetate, ethyl acetate, butyl acetate; ether such as dioxane, ethylene glycol monoethyl ether, ethylene glycol monomethyl ether; and mixtures of them.

The mixture ratio of the binding agent and the phosphor particles in the coating solution varies with characteristics of a radiation image conversion panel to be obtained, phosphor types, etc. In general, the mixture ratio between the binding agent and the phosphor particles is selected from a range of 1:1 to 1:100 (weight ratio), preferably a range of 1:8 to 1:40 (weight ratio).

Note that the coating solution may be mixed with various additive agents, such as a plasticizer for enhancing the bond strength between the binding agent and phosphor particles in the phosphor layer after formation. The preferred examples of a plasticizer that is employed for such a purpose are: phosphoric ester such as triphenyl phosphate, tricresyl phosphate, diphenyl phosphate, etc.; phthalic ester such as diethyl phthalate, dimetoxyethyl phthalate, etc.; glycolic ester such as ethyl phthalyl ethyl glycolate, butyl phthalyl butyl glycolate, etc.; and polyester of polyethylene glycol and aliphatic dibasic acid, such as polyester of triethyleneglycol and adipic acid, polyester of diethylene glycol and succinic acid, etc.

The coating solution containing phosphor particles and a binding agent, prepared as described above, is coated uniformly on the surface of a temporary support body for sheet formation, whereby a film of coating solution is formed. The coating operation can be carried out by employing ordinary coating means, such as an extrusion coater, a slide coater, a doctor blade, a roll coater, a knife coater, etc.

The temporary support body can be arbitrarily selected, for example, from glass, metal plate, various materials employed as support bodies for intensifying paper (or an intensifying screen) in the conventional radiography, and materials known At as the support bodies for the radiation image conversion panel. The preferred examples of such materials are: resin film such as cellulose triacetate, poly (ethyleneterephthalate), polyamide, polyimide, polycarbonate, etc.; metal sheet such as aluminum alloy foil, stainless foil, etc.; ordinary paper; baryta paper; resin-coated paper; pigment paper containing pigment such as titan dioxide, etc.; paper having sized poly (vinyl alcohol); and ceramic plate or sheet, such as alumina, zirconia, magnesia, titania, etc.

After the coating solution for phosphor layer formation has been coated on the temporary support body and dried, it is removed from the temporary support body and used as a phosphor sheet that becomes the phosphor layer of the radiation image conversion panel. Therefore, it is preferable that a separating agent be coated beforehand on the surface of the temporary support body so that the formed phosphor sheet can be readily removed from the temporary support body.

Next, a support body for the radiation image conversion panel is prepared separately from the phosphor sheet formed as described above. This support body can be selected arbitrarily from the same materials as the temporary support body employed in forming the phosphor sheet.

It is known in conventional radiation image conversion panels to provide (1) an adhesive layer that is formed by coating a high polymer substance (such as polyester copolymer, acrylic resin copolymer, etc.) on the support body surface on the side where the phosphor layer is provided, (2) a light reflection layer consisting of a light reflecting substance such as titan dioxide, or (3) a light absorption layer consisting of a light absorbing substance such as carbon black, in order to strengthen the bond between the support body and the phosphor layer, or in order to enhance sensitivity or picture quality (sharpness, graininess) for the radiation image conversion panel. These layers can also be provided for the support body to be employed in the present invention, and the construction can be arbitrarily selected according to the purpose and application of a desired radiation image conversion panel.

Furthermore, as described in Japanese Unexamined Patent Publication No. 59(1984)-200200, micro unevenness may be formed on a surface, on the phosphor layer side, of the support body (in the case where an adhesive layer, a light reflection layer, or a light absorption layer is provided on a surface, on the phosphor layer side, of the support body, on the surface) for the purpose of enhancing sharpness for an image obtained.

The phosphor sheet, obtained by dispersing and coating, is placed on the support body and is bonded to the support body while compressing the phosphor sheet at a temperature higher than the softening temperature or melting point of the binding agent.

As examples of a compressing device to be employed in the compression process of the present invention, a calender roll, a hot press, etc., are generally known. For instance, the compression process by a calender roll is performed by placing a phosphor sheet, obtained by dispersing and coating, on a support body and passing them at a predetermined speed through a roller heated to a temperature higher than the softening temperature or melting point of the binding agent. However, the present invention is not limited to these compressing devices, but can employ any type of compressing device if it can compress such a sheet while heating the sheet. It is preferable that the compression pressure be 5 MPa or greater.

In ordinary radiation image conversion panels, a transparent protection film, for physically and chemically protecting the phosphor layer, is provided on a surface of the phosphor layer remote from the support body, as described previously. It is preferable that such a transparent protection film also be installed in the radiation image conversion panel of the present invention.

The transparent protection film can be formed, for example, by a method of dissolving a cellulose derivative (such as fluorocarbon copolymer, cellulose acetate, nitrocellulose, etc.) or transparent synthetic resin (such as poly methyl methacrylate, polyvinyl butyral, polyvinyl formal, polycarbonate, polyvinyl acetate, vinyl chloride, vinyl acetate copolymer, etc.) into a proper solvent and coating the prepared solution on the surface of the phosphor layer. The transparent protection film can also be formed by a method of forming a plastic sheet (which consists of polyethylene terephthalate, polyethylene naphthalate, polyethylene, polypropylene, polyvinylidene chloride, polyamide, etc.) and a protection film sheet (such as a transparent glass sheet) separately and bonding them to the surface of the phosphor layer with an appropriate binding agent. It is preferable that the film thickness of the protection film generally be in a range of 0.1 to 20 μm.

Furthermore, a colored layer, which absorbs excitation light and does not absorb photostimulated luminescent light, may be added to any one of the aforementioned layers for the purpose of enhancing sharpness for an image obtained (see Japanese Patent Publication No. 59(1984)-23400).

Embodiments of the present invention will hereinafter be described. However, the present invention is not to be limited to these embodiments.

(First Embodiment)

First, a phosphor sheet that becomes a phosphor layer was manufactured as follows. As a coating solution for phosphor sheet formation, (1) 1000 g of a phosphor ($BaFBr_{0.85}I_{0.15}$:Eu2+), (2) 35.5 g of polyurethane elastomer (e.g., PANDX T-5265H (solid state) manufactured by Dainippon Ink) as a binding agent, (3) 4.5 g of polyisocyanate (e.g., COLONATE HX (100% solid state) manufactured by Nippon Polyurethane) as a cross-linking agent, (4) 10 of epoxy resin (e.g., EPICOAT #1001 (solid state) manufactured by YukA Shell Epoxy) as an anti-yellowing agent, (5) 0.02 g of an ultramarine blue pigment (e.g., SM-1 manufactured by Daiichi Kasei) as a coloring agent, and (6) 0.2 g of benzoic acid as an aryl carbonic acid, were added to a mixed solvent of methyl ethyl ketone and toluene (=7/3) and dispersed for 3 hr with a disperser. In this manner, a coating solution with a viscosity of 3 Pa·s (25° C.) was prepared. This coating solution was coated on a temporary support body (polyethylene terephthalate sheet of thickness 180 μm, coated with a silicon separating agent) with an extrusion coater. After being dried, it was separated from the temporary support body. In this way, a phosphor sheet of thickness 300 μm was manufactured.

Next, (1) 350 g of fine particles (where the size of particles of 90 weight % of all particles is in a range of 1 to 5 μm) of cadmium oxide ($Gd_2O_3$), (2) 1800 g of soft acrylic resin (e.g., KURISCOAT P-1018GS (20%-toluen solution) manufactured by Dainippon Ink) as a binding agent, (3) 40 g of phthalic ester (e.g., #10 manufactured by Daihatchi Kagaku) as a plasticizer, (4) 120 g of ZnO whisker (e.g., PANATETRA A-1-1 manufactured by Matsushita Amteck) as a conducting agent, and (5) 2 g of an ultramarine blue pigment (e.g., SM-1 manufactured by Daiichi Kasei) as a coloring agent, were added to methyl ethyl ketone and were dispersed and dissolved with a disperser. In this manner, a dispersed solution (with a viscosity of 0.5 Pa s at 20° C.) for forming a reflection material layer was prepared. This dispersed solution was uniformly coated on a surface of a support body (polyethylene terephthalate sheet) remote from a light intercepting layer with an extrusion coater. As the support body, there is, for example, LUMIRA S-10 with a thickness of 250 μm and a typical haze of 20 (in which a light intercepting layer (about 18 μm), consisting of carbon black, silica, and a binding agent, has been provided on one side), manufactured by Toray Industries. Then, the coated film was dried. In this manner, a reflection material layer of thickness 20 μm was formed.

Subsequently, the phosphor sheet and the support body, which has the reflection material layer, were stacked and continuously compressed by a calender roll with a pressure of 49 MPa, an upper roll temperature of 75° C., a lower roll temperature of 75° C., and a feed speed of 10 m/min. With the heating and compression, there was obtained a phosphor layer with a thickness of 210 μm in which the phosphor sheet has been completely bonded to the support body through the reflection material layer.

Next, (1) 185 g of fluoroolefin=vinylether copolymer (e.g., LUMIFLEON LF-504X (30%-xylene solution) manufactured by Asahi Glass) as fluororesin, (2) 10 g of polyisocyanate (e.g., SUMIJULEN3500 (100% solid state) manufactured by Sumitomo Baieru Urethane) as a cross-linking agent, (3) 1 g of alcohol denatured silicon (e.g., X-22-2809 (66%-xylene contained paste) manufacture by Shinetsu Chemical) as a sliding agent, (4) 13 g of melamine-formaldehyde resin powder (e.g., EPSTAR AL-M manufactured by Nippon Shokubai) as an organic filler, (5) 0.2 g of acetoalkoxy aluminum diisopropylate (e.g., Purenakuto manufactured by Ajinomoto) as a coupling agent, and (6) 0.7 mg of dibutyltyndilaulate (e.g., KS1260 manufactured by Kyodo Yakuhin) as a catalyzer, were added to 133 g of methyl ethyl ketone, where by a coating solution with a viscosity of 3 mPa.s was prepared. This coating solution was coated on a laminate of a 9-μm-thick PET film (e.g., LUMIRA 9-F53 manufactured by Toray Industries) and a heat resistance separation film (e.g., CT38 manufactured by Panac), and they were thermally hardened by performing a heating process for 20 min at 120° C. After drying, a coated layer with a thickness of 2 μm was formed. Subsequently, the heat resistance separation film was separated from the 9-μm-thick PET film provided with the coated layer, and on the opposite side to the coated layer, a polyester resin solution (e.g., BAIRON 30SS manufactured by Toyoboseki) was coated and dried, whereby an adhesive layer with a binding-agent coated weight of 2 $g/m^2$ was formed. This PET film was bonded on the phosphor layer through the adhesive layer with a laminator roll, whereby a protection layer was formed. Furthermore, the protection layer was embossed to have a roughness of Ra=0.4 μm with an embosser.

Next, a 20-μm-thick OPP film (e.g., TREFAN YM-11#20 manufactured by Toray Industries) was provided with an adhesive layer with a binding-agent coated weight of 9 $g/m^2$ by coating and drying a polyester resin solution (e.g., BAIRON 30SS manufactured by Toyoboseki). This OPP film was bonded on the opposite side (light intercepting layer side) of the support body remote from the phosphor layer, through the adhesive layer with the laminator roll. The bonded OPP film serves as a back protection layer.

Finally, (1) 70 g of polyurethane having a polydimethylsiloxane unit (e.g., DIAROMA SP-3023 (15%-(methyl ethyl ketone)/(toluene) solution) manufactured by Dainichiseika Color) as a silicon polymer, (2) 3 g of polyisocyanate (e.g., CROSNATED-70 (50% solution) manufactured by Dainichiseika Color) as a cross-linking agent, (3) 0.6 g of epoxy resin (e.g., EPICOAT #1001 (solid state) manufactured by YukA Shell Epoxy) as an anti-yellowing agent, and (4) 0.2 g of alcohol denatured silicon (e.g., x-22-2809 (66%-xylene contained paste) manufacture by Shinetsu Chemical) as a sliding agent, were dissolved into 15 g of methyl ethyl ketone, whereby a coating solution was prepared. This coating solution was coated on each face of the phosphor sheet provided with the protection layer. In the aforementioned manner, a radiation image conversion panel with upper and side faces protected with the protection layer was manufactured.

(Second Embodiment)

A radiation image conversion panel was manufactured in the same manner as the first embodiment, except that the amount of the benzoic acid employed in the first embodiment for manufacturing the phosphor sheet was 0.5 g.

(Third Embodiment)

A radiation image conversion panel was manufactured in the same manner as the first embodiment, except that the amount of the benzoic acid employed in the first embodiment for manufacturing the phosphor sheet was 1 g.

(Fourth Embodiment)

A radiation image conversion panel was manufactured in the same manner as the first embodiment, except that the amount of the benzoic acid employed in the first embodiment for manufacturing the phosphor sheet was 5 g.

(Fifth Embodiment)

0.5 g of benzoic acid was dissolved into methyl ethyl ketone 1000 g and mixed with 1000 g of the stimulatable phosphor particles employed in the first embodiment. After heating, the methyl ethyl ketone was removed and stimulatable phosphor particles, processed with phenylphosphonic acid, were obtained.

With the stimulatable phosphor particles processed with the benzoic acid prepared as described above, a radiation image conversion panel was manufactured in the same manner as the first embodiment except that benzoic acid was not added at the time of mixing and dispersion.

(Sixth Embodiment)

A radiation image conversion panel was manufactured in the same manner as the first embodiment, except that phthalic acid was used instead of benzoic acid.

(Seventh Embodiment)

A radiation image conversion panel was manufactured in the same manner as the first embodiment, except that salicylic acid was used instead of benzoic acid.

COMPARATIVE EXAMPLE

A radiation image conversion panel was manufactured in the same manner as the first embodiment, except that benzoic acid was removed.

(Evaluation of Radiation Image Conversion Panels)

The phosphor fill ratios for the phosphor layers of the radiation image conversion panels of the embodiments and comparative example, manufactured as described above, were calculated by the following Equation. Note that the phosphor density is 5.1 g/cm³ and the binding agent density is 1.14 g/cm³.

(Measurement and Calculation of Void Ratio)

The thickness d (cm) and weight W (g) of 3-cm-square phosphor layers were measured and the void ratios were calculated from the difference between the theoretical density value and the actual density value by the following Equation:

$$100 - [(Wp+Wb)/(Wp/\rho p+Wb/\rho b) - (W/3 \times 3 \times d)]/[(Wp+Wb)/((Wp/\rho p+Wb/\rho b)] \times 100$$

in which Wp is the unit weight (g) of the phosphor, Wb is the unit weight (g) of the binding agent, ρp is the density of the phosphor (about 5.0), and ρb is the density of the binding agent (about 1.2).

(Evaluation of Picture Qualities)

The picture qualities for the radiation image conversion panels were evaluated as follows. X-rays with a tube voltage of 80 kvp were irradiated to each radiation image conversion panel, and the phosphor was excited by scanning He-Ne laser light (632.8 nm). The photostimulated luminescence radiated from the phosphor layer was received and converted into an electrical signal. This signal was reproduced as an image by an image reproducer and displayed on a display unit. The amount of the photostimulated luminescence was measured and noise (RM) at a dose of 10 mR was measured. The measuring unit used FCR 9000 manufactured by Fuji Photo Film.

(Evaluation of Running Performance)

Each radiation image conversion panel was run 10,000 times with a temperature of 10° C. and a humidity of 90% by the use of a running machine designed after the model of FCR 9000. After running, it was confirmed whether or not a reproduced image is satisfactory. When it is satisfactory it is represented by ○, when it is slightly unsatisfactory it is represented by Δ, and when it is unsatisfactory it is represented by X. The results are listed in Table 1. Note that the amount of the photo stimulated luminescence was expressed with that of the comparative example as 100.

TABLE 1

| | Phosphor fill ratio (%) | Amount of photostimulated luminescence | Noise (x 10⁻²) | Running durability |
|---|---|---|---|---|
| First embodiment | 76 | 114 | 0.17 | ○ |
| Second embodiment | 77 | 114 | 0.14 | ○ |
| Third embodiment | 78 | 115 | 0.12 | ○ |
| Fourth embodiment | 78 | 115 | 0.12 | ○ |
| Fifth embodiment | 78 | 115 | 0.12 | ○ |
| Sixth embodiment | 77 | 115 | 0.15 | ○ |
| Seventh embodiment | 77 | 114 | 0.15 | ○ |
| Comparative embodiment | 71 | 100 | 0.28 | Δ |

As will be clear from Table 1, the radiation image conversion panels of the present invention are higher in amount of photostimulated luminescence, less in graininess noise, and higher in running performance, because the phosphor fill ratios are high compared with the comparative example in which the radiation image conversion panel was manufactured without employing aryl carbonic acid.

As has been described above, the radiation image conversion panel of the present invention contains aryl carboxylic acid or alicyclic carboxylic acid in the phosphor layer, so that the dispersibility of stimulatable phosphor particles is enhanced. Therefore, the radiation image conversion panel is capable of increasing a fill ratio for the stimulatable phosphor particles, while suppressing sensitivity reduction due to the compression process. In addition, it becomes possible to form a satisfactory image with less noise. Furthermore, the radiation image conversion panel has excellent moisture proofing and enhanced running durability.

While the present invention has been described with reference to the preferred embodiments thereof, the invention is not to be limited to the details given herein, but may be modified within the scope of the invention hereinafter claimed.

What is claimed is:

1. A radiation image conversion panel comprising at least:
   a support body; and
   a phosphor layer provided on said support body;
   wherein said phosphor layer contains a binding agent, a phosphor, and at least aryl carboxylic acid or alicyclic carboxylic acid, expressed by the following general Formula:

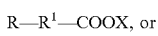

in which R represents (1) an aryl group; (2) an aryl group, replaced with an alkyl group whose number of carbons is 1 to 5, a hydroxyl group, a carboxylic acid group, or a halogen group; (3) a hydroaryl group; or (4) a hydroaryl group (alicyclic group), replaced with an alkyl group whose number of carbons is 1 to 5, a hydroxyl group, or a halogen group; $R^1$ is a hydrocarbon radical whose number of carbons is 1 to 12; and X represents a hydrogen atom, alkaline metal, or —$N^+(R^2)_4$ (where $R^2$ represents an alkyl group whose number of carbons is 2 or less).

2. The radiation image conversion panel as set forth in claim 1, wherein the letter R in said general Formula is either (1) an aryl group or (2) an aryl group, replaced with an alkyl group whose number of carbons is 1 to 5, a hydroxyl group, or a halogen group.

3. The radiation image conversion panel as set forth in claim 1, wherein said binding agent is thermoplastic elastomer with a softening temperature or melting point of 30 to 150° C.

4. The radiation image conversion panel as set forth in claim 2, wherein said binding agent is thermoplastic elastomer with a softening temperature or melting point of 30 to 150° C.

5. The radiation image conversion panel as set forth in claim 3, wherein said binding agent is polyurethane resin.

6. The radiation image conversion panel as set forth in claim 4, wherein said binding agent is polyurethane resin.

7. The radiation image conversion panel as set forth in claim 1, wherein said phosphor layer is formed by dispersing and coating said phosphor, said aryl carboxylic acid or alicyclic carboxylic acid, and said binding agent, and said phosphor layer and said support body are bonded together by placing said phosphor layer on said support body and compressing said phosphor layer at a temperature higher than the softening temperature or melting point of said binding agent.

8. The radiation image conversion panel as set forth in claim 1, wherein a surface process is performed on particles of said phosphor with said aryl carboxylic acid or alicyclic carboxylic acid, said phosphor layer is formed by dispersing and coating said surface-processed phosphor particles and said binding agent, and said phosphor layer and said support body are bonded together by placing said phosphor layer on said support body and compressing said phosphor layer at a temperature higher than the softening temperature or melting point of said binding agent.

* * * * *